United States Patent [19]
Ritzie

[11] B  3,985,349
[45] Oct. 12, 1976

[54] INJECTION MOLDING MACHINE AND METHOD OF OPERATION THEREOF

[75] Inventor: Robert H. Ritzie, Mystic, Conn.

[73] Assignee: The Dow Chemical Company, Midland, Mich.

[22] Filed: Mar. 6, 1975

[21] Appl. No.: 556,057

[44] Published under the second Trial Voluntary Protest Program on January 13, 1976 as document No. B 556,057.

[52] U.S. Cl. .............................................. 259/191
[51] Int. Cl.² ......................................... B29B 1/06
[58] Field of Search ............ 259/191, 192, 193, 9, 259/10, 25, 26, 45, 46, 109, 110, 97; 425/207, 208, 209

[56] References Cited
UNITED STATES PATENTS

| | | | |
|---|---|---|---|
| 3,175,248 | 3/1965 | Swenson | 259/191 |
| 3,712,594 | 1/1973 | Hensen | 259/9 |
| 3,737,151 | 6/1973 | Schaeffer | 259/191 |
| 3,746,318 | 7/1973 | Schippers | 259/191 |

Primary Examiner—Robert W. Jenkins
Attorney, Agent, or Firm—Robert B. Ingraham

[57] ABSTRACT

Improved mixing is obtained in a reciprocating screw injection molding machine by providing an axial passage within the screw. The passage provides communication between the discharge end of the screw and an upstream location. A valve is disposed within the passage to provide selective communication. Recirculation of melt within the passage and about the screw provides improved mixing.

5 Claims, 2 Drawing Figures

INJECTION MOLDING MACHINE AND METHOD OF OPERATION THEREOF

In injection molding machines, considerable difficulty has been encountered in obtaining a desired degree of mixing of material passing therethrough, particularly viscous thermoplastic melts. Oftentimes it is desirable to blend one or more resins and form them into shaped articles. Oftentimes, coloring material is introduced into thermoplastic compositions by providing a plurality of granules of a color concentrate and admixing the granules with uncolored granules of a similar resinous composition. Frequently for particular parts being molded, adequate mixing within the barrel of a reciprocating screw injection machine is obtained and with other moldings, less than desirable mixing is obtained. In cases when less than desired mixing is obtained, it is often necessary to provide another means of dispersing pigments or other additives within a composition prior to supplying the composition to the injection molding machine. Oftentimes, such auxiliary mixing equipment is expensive and requires substantial labor for the operation thereof.

It would be desirable if there were available an improved reciprocating screw injection molding machine which provides improved mixing.

It would also be desirable if there were available an improved method for the operation of a screw injection molding machine to provide dispersion and mixing of the compositions processed thereby.

It would also be desirable if there were available an improved reciprocating screw injection molding machine which could readily be fabricated by modifying existing equipment.

These benefits and other advantages in accordance with the present invention are achieved in a reciprocating screw injection molding machine, the molding machine comprising a barrel having a rotating forwarding extruder screw therein the screw having at least one forwarding flight, means to reciprocately position the screw within the barrel and means to heat plastify synthetic resinous thermoplastic materials within the barrel, the improvement which comprises the screw having a feed zone adjacent the feed end, a first compression zone adjacent the feed zone and disposed toward a discharge end of the screw, a decompression zone disposed adjacent the first compression zone and remote from the feed zone, a second compression zone disposed at the discharge end of the screw and adjacent the decompression zone, at least one passage defined within the screw providing a path between the decompression zone and the discharge end of the screw, a valving means to selectively open or close the passage within the screw.

Also contemplated within the scope of the present invention is a method for the operation of a reciprocating screw injection molding machine, the molding machine having a barrel, an inlet end and a discharge end, a rotating reciprocating screw disposed within the barrel supplying heat plastifiable thermoplastic material to the feed end of the barrel, rotating the screw, forwarding thermoplastic material toward the discharge end of the screw through a first compression zone into a decompression zone, into a second compression zone and passing a portion of the heat plastified composition from the discharge end of the screw through the screw and discharging it into the decompression zone through a passage formed in the screw, closing the passage within the screw and discharging material from the molding machine.

Further features and advantages of the present invention will become more apparent from the drawing wherein.

Figure 1:
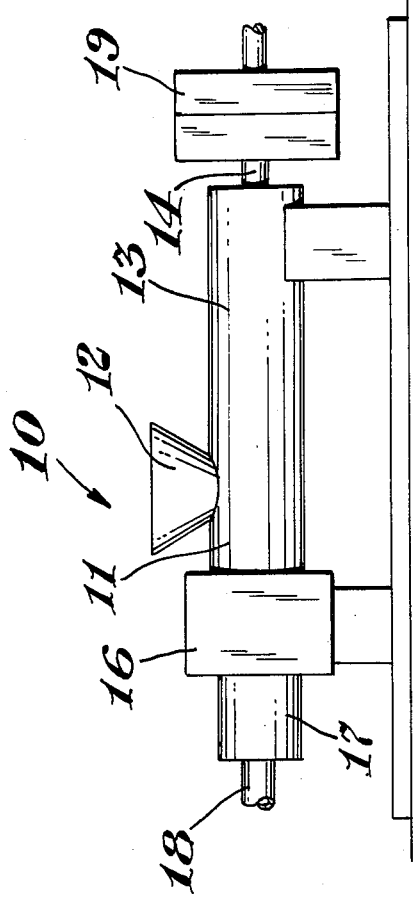
FIG. 1 is a schematic representation of an injection molding apparatus in accordance with the present invention.

In FIG. 1, there is schematically depicted a reciprocating screw injection molding machine generally designated by the reference numeral 10. The machine 10 comprises in cooperative combination an injection unit 11 having a molding material source or feed hopper 12. The machine 10 has a hollow barrel 13 having a discharge end or nozzle end 14. Oppositely disposed to the nozzle 14 is a drive means 16 adapted to rotate the screw (not shown). A screw reciprocating means 17 such as a hydraulic cylinder is positioned adjacent the drive means 16. A valve operator 18 such as a hydraulic cylinder is carried by the screw positioning means 17. A mold 19 is shown in contact with the nozzle 14 (mold support and operating means are not shown).

Figure 2:
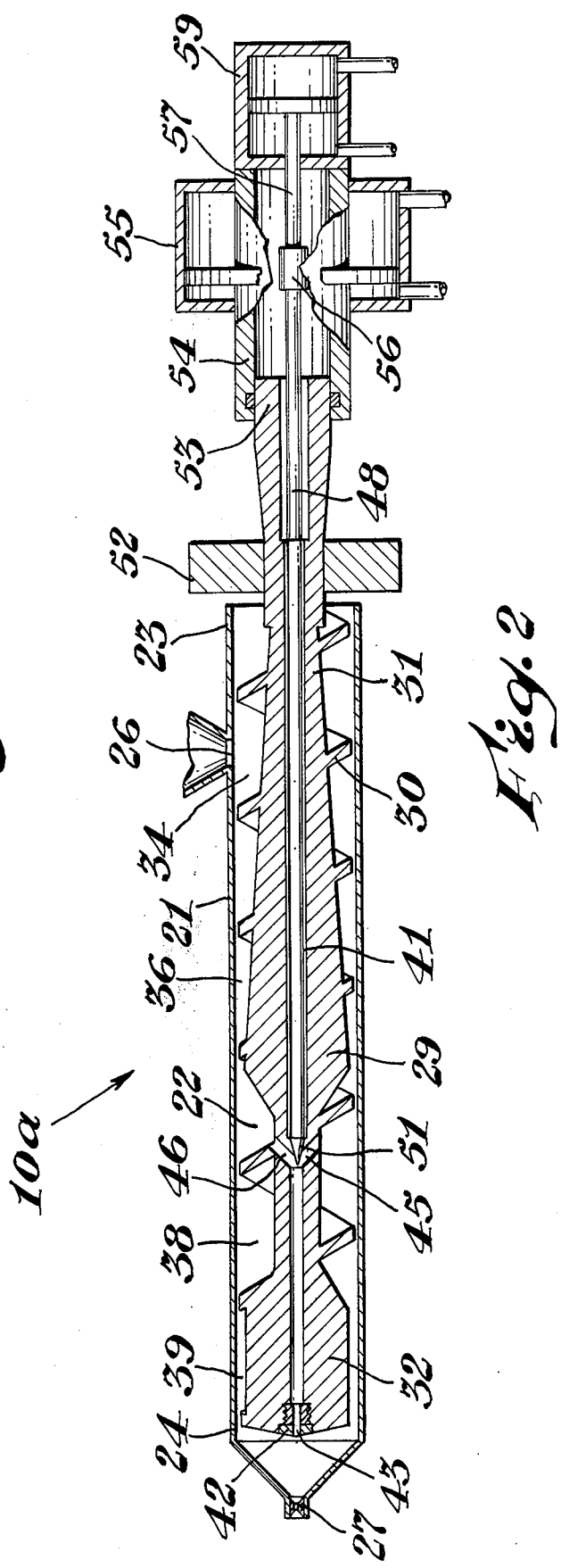
FIG. 2 is a schematic representation of a sectional view of a screw modified in accordance with the present invention disposed within a barrel of a reciprocating screw injection molding machine.

In FIG. 2, there is schematically represented a sectional view of a portion of a reciprocating screw injection molding machine generally designated by the reference numeral 10a. The machine comprises a generally hollow cylindrical extruder barrel 21; the barrel 21 has a generally elongate cylindrical configuration and defines therein a generally cylindrical cavity 22. The barrel 21 has a first inlet end 23 and a second or discharge end 24. The barrel 21 defines a feed port 26. A mold engaging nozzle 27 is affixed to the second end 24 of the barrel 21 and is generally coaxially disposed with respect to the cavity 22. The barrel 21 has conventional heating means not shown. A reciprocating extrusion screw 29 is disposed generally within the cavity 22 of the barrel 21. The screw 29 has an elongate configuration, a material forwarding flight 30, a first or feed end 31 and a second or discharge end 32. The screw has a feed zone 34 disposed generally adjacent the inlet end 26. A compression zone 36 is adjacent the feed zone 34 and remotely disposed from the first end 31. A decompression zone 38 is disposed adjacent the compression zone 36 and is remotely disposed from the first end 31. As depicted in FIG. 2, the decompression zone 38 is obtained by decreasing the root diameter of the screw in the area wherein the decompression is desired. A second or terminal compression zone 39 is disposed adjacent the second end 32 of the screw 29. The second compression zone 39 is a region of maximum root diameter. A passage 41 is defined within the screw 29. The passage 41 is axially disposed and extends from the first end 31 to the second end 32. A threaded bushing 42 is disposed within the passage 41 adjacent the second end 32. The bushing 42 defines a second passage 43 generally coaxial with the passage 41. The screw 29 defines a first generally radially extending passage 45 and a second generally radially extending passage 46 in the region of the decompression zone 38. The passages 46 and 45 provide communication between the passage 41 and space external to the screw within the decompression zone. A valving member 48 is disposed within the passage 41 and extends from the first end 31 of the screw 29 to a location generally adjacent the passages 45 and 46. The valving member 48 terminates in a generally frustoconical valving face 51. The face 51 is adapted to engage the portion of the screw 29 generally adjacent the junction of passages 41, 45 and 46 and provide selective communication therebetween. The first end 31 of the screw 29 has affixed thereto a drive means or gear 52 which is in operative combination with a drive train not shown. Adjacent the drive means 52 is a swivel joint 53 which is in operative combination with a hollow shaft 54 of a linear actuator or hydraulic cylinder 55. The hydraulic cylinder 55 provides a means to reciprocally position the screw within the barrel 21. The valving means 48 remote from the screw 29 is affixed to a swivel joint 56 which in turn connects to a shaft 57 of a linear actuator or hydraulic cylinder 59 which is affixed to and supported by the hollow shaft 54.

In operation of the apparatus is depicted in FIGS. 1 and 2, with particular emphasis on FIG. 2, the screw 29 is rotated within the barrel 21. Thermoplastic material is fed through the port 26. Rotation of the screw causes the material to pass from the feed zone 34 into the first compression zone 36. From the compression zone 36 where it is at least partially heat plastified, it is forwarded to the decompression zone 38. The material is then forwarded by the flight 30 through the decompression zone 38 to the second compression zone 39 and into space lying between the second end 32 of the screw 29 and the second end 24 of the barrel 21. With the valving member 48 in the position indicated in FIG. 2, material then flows into the passage 43 of the bushing 42 through the passage 41 into the passages 45 and 46 and is discharged into the decompression zone. Recirculation of the material through the passage 41 and the valving member 48 causes improved mixing of the thermoplastic melt. When adequate mixing is obtained, the screw 29 is withdrawn and additional material circulated through the passage 41, the valving member 48 pushed forward, that is, toward a second end 32 of the screw 29 preventing communication between the passage 41 and the passages 45 and 46. The screw 29 is then forced into its forward position as depicted in FIG. 2 by the operator 55 discharging accumulated mixed and heat plastified material from the barrel and desirably into a mold.

Employing apparatus as hereinbefore described, substantially improved mixing is obtained over that obtained employing conventional reciprocating screw injection molding machines.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a reciprocating screw injection molding machine, the molding machine comprising a barrel having a rotating forwarding extruder screw therein the screw having at least one forwarding flight, means to reciprocately position the screw within the barrel and means to heat plastify synthetic resinous thermoplastic materials within the barrel, the improvement which comprises the screw having a feed zone adjacent the feed end, a first compression zone adjacent the feed zone and disposed toward a discharge end of the screw, a decompression zone disposed adjacent the first compression zone and remote from the feed zone, a second compression zone disposed at the discharge end of the screw and adjacent the decompression zone, at least one passage defined within the screw providing a path between the decompression zone and the discharge end of the screw, a valving means to selectively open or close the passage within the screw.

2. The molding machine of claim 1 wherein the passage is generally axially disposed within the screw.

3. The machine of claim 1 wherein the valving means is generally axially disposed within the screw and comprises a generally rod-like valving member which is selectively positionable within the passage.

4. The machine of claim 1 including a removable bushing disposed at the discharge end of the screw, the bushing defining a bushing passage of lesser diameter than the passage of the screw.

5. A method for the operation of a reciprocating screw injection molding machine, the molding machine having a barrel, an inlet end and a discharge end, a rotating reciprocating screw disposed within the barrel supplying heat plastifiable thermoplastic material to the feed end of the barrel, rotating the screw, forwarding thermoplastic material toward the discharge end of the screw through a first compression zone into a decompression zone, into a second compression zone and passing a portion of the heat plastified composition from the discharge end of the screw through the screw and discharging it into the decompression zone through a passage formed in the screw, closing the passage within the screw and discharging material from the molding machine.

\* \* \* \* \*